United States Patent
Lazarini et al.

(10) Patent No.: US 10,207,677 B1
(45) Date of Patent: Feb. 19, 2019

(54) SYSTEMS AND METHODS FOR EXTENDING THE RANGE OF A PASSIVE ENTRY AND PASSIVE START SYSTEM IN A VEHICLE

(71) Applicant: GM Global Technology Operations LLC, Detroit, MI (US)

(72) Inventors: Marcelo Lazarini, Macomb, MI (US); Alex Smith, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/664,275

(22) Filed: Jul. 31, 2017

(51) Int. Cl.
*B60R 25/20* (2013.01)
*B60R 25/01* (2013.01)
*B60R 25/24* (2013.01)

(52) U.S. Cl.
CPC ............ *B60R 25/209* (2013.01); *B60R 25/01* (2013.01); *B60R 25/241* (2013.01)

(58) Field of Classification Search
CPC ...... B60R 25/209; B60R 25/01; B60R 25/241
USPC ................................................ 340/5.61, 5.72
See application file for complete search history.

(56) References Cited

U.S. PATENT DOCUMENTS

| | | | | |
|---|---|---|---|---|
| 6,400,968 B1* | 6/2002 | White | ................... | G08C 17/02 455/127.1 |
| 6,434,158 B1* | 8/2002 | Harris | ................... | G06Q 20/40 370/401 |
| 9,452,732 B1* | 9/2016 | Hermann | ................ | B60R 25/10 |
| 2001/0011941 A1* | 8/2001 | King | .................. | G07C 9/00182 340/5.64 |
| 2003/0162528 A1* | 8/2003 | Juzswik | ............. | G07C 9/00182 455/411 |
| 2004/0022221 A1* | 2/2004 | Chwieseni | .............. | H04L 45/00 370/338 |
| 2004/0185844 A1* | 9/2004 | Neuman | ............ | G07C 9/00182 455/420 |
| 2005/0024254 A1* | 2/2005 | Chuey | .................... | G08C 17/02 341/176 |
| 2005/0226201 A1* | 10/2005 | McMillin | ................ | H04L 45/00 370/348 |
| 2006/0290467 A1* | 12/2006 | Fitzgibbon | ......... | G07C 9/00182 340/5.7 |
| 2008/0106391 A1* | 5/2008 | Santavicca | ............ | B60R 25/209 340/426.36 |

* cited by examiner

*Primary Examiner* — Edwin C Holloway, III

(57) ABSTRACT

An apparatus operable to provide a communication link between a passive entry and passive (PEPS) start system of a target vehicle and a user device operable to control the PEPS system, the apparatus comprising: i) a first wireless transceiver adapted to be installed in a first vehicle and configured to communicate with the user device and with a second wireless transceiver associated with a second vehicle; and ii) a master controller module configured in a blind rebroadcast mode: a) to receive via the first wireless transceiver a control message sent from a transmitting source and to transmit the control message via the first wireless transceiver to the second wireless transceiver associated with the second vehicle; and b) to receive via the first wireless transceiver a response message originated by the PEPS system of the target vehicle and to transmit the response message via the first wireless transceiver to the transmitting source.

7 Claims, 5 Drawing Sheets

| V1 | V2 | V3 | V4 | V5 | V6 | V7 | V8 | V9 | V10 | V11 | V12 | V13 | V14 | V15 |
|----|----|----|----|----|----|----|----|----|-----|-----|-----|-----|-----|-----|
| 2  | 1  | 2  | 3  | 4  | 1  | 1  | 2  | 3  | 4   | 6   | 6   | 7   | 8   | 9   |
| 6  | 3  | 4  | 5  | 9  | 2  | 2  | 3  | 4  | 5   | 7   | 7   | 8   | 9   | 10  |
| 7  | 6  | 7  | 8  | 10 | 7  | 3  | 4  | 5  | 9   | 12  | 8   | 9   | 10  | 14  |
|    | 7  | 8  | 9  |    | 11 | 6  | 7  | 8  | 14  |     | 11  | 12  | 13  |     |
|    | 8  | 9  | 10 |    |    | 8  | 9  | 10 | 15  |     | 13  | 14  | 15  |     |
|    |    |    |    |    |    | 11 | 12 | 13 |     |     |     |     |     |     |
|    |    |    |    |    |    | 12 | 13 | 14 |     |     |     |     |     |     |
|    |    |    |    |    |    | 13 | 14 | 15 |     |     |     |     |     |     |

SYSTEMS AND METHODS FOR EXTENDING THE RANGE OF A PASSIVE ENTRY AND PASSIVE START SYSTEM IN A VEHICLE

INTRODUCTION

The present disclosure relates to vehicle entry and start systems and, more particularly, to a passive entry and passive start (PEPS) system using a key fob or a mobile device.

Vehicles using passive entry and passive start (PEPS) systems (or remote keyless systems) are increasingly common. The remote keyless system may be used, for example, to start a vehicle or to actuate an electronic door lock without using a traditional mechanical key. When the user device (i.e., key fob, smartphone, or other mobile device) is near the vehicle, pressing a button on the user device or touching a vehicle door either locks or unlocks the vehicle doors. When the key fob, smartphone or other device is in the vehicle, the vehicle can be started by pushing a button or other actuator.

Many PEPS systems use a Bluetooth Low Energy (BLE) transceiver in the key fob or smartphone to communicate with another BLE transceiver in the vehicle. However, the range of a BLE transceiver may be greatly reduced when environmental variables are not ideal, such as bad weather, crowded parking lots, parking structures, or other obstacles.

Therefore, there is a need for improved passive entry and passive start (PEPS) systems. In particular, there is a need for systems and methods that enhance the range of PEPS systems

SUMMARY

An apparatus operable to provide a communication link between a passive entry and passive (PEPS) start system of a target vehicle and a user device operable to control the PEPS system, the apparatus comprising: i) a first wireless transceiver adapted to be installed in a first vehicle and configured to communicate with the user device and with a second wireless transceiver associated with a second vehicle; and ii) a master controller module configured in a blind rebroadcast mode: a) to receive via the first wireless transceiver a control message sent from a transmitting source and to transmit the control message via the first wireless transceiver to the second wireless transceiver associated with the second vehicle; and b) to receive via the first wireless transceiver a response message originated by the PEPS system of the target vehicle and to transmit the response message via the first wireless transceiver to the transmitting source.

In other features, the transmitting source is the user device.

In still other features, the transmitting source is a third wireless transceiver associated with a third vehicle.

In yet other features, the master controller module receives the response message from the second transceiver of the second vehicle.

In other features, the second vehicle is the target vehicle.

In other features, the master controller module is configured in a community broadcast mode: i) to receive via the first wireless transceiver a control message sent from a transmitting source and to determine from the control message the target vehicle to which the control message is to be sent; and ii) to determine from a community broadcast table in a memory associated with the master controller module a relay path from the first vehicle to the target vehicle, the relay path comprising at least one intermediate vehicle between the first vehicle and the target vehicle.

In other features, the master control module transmits the control message to the at least one intermediate vehicle.

In other features the master control module transmits information associated with the relay path to the at least one intermediate vehicle.

In other features, the community broadcast table comprises a first vehicle identification list of all vehicles with which the first vehicle can communicate.

In other features, the community broadcast table comprises at least a second vehicle identification list of all vehicles with which the at least one intermediate vehicle can communicate.

There is provided an apparatus operable to provide a communication link between a passive entry and passive (PEPS) start system of a target vehicle and a user device operable to control the PEPS system, the apparatus comprising: i) a first wireless transceiver adapted to be installed in a first vehicle and configured to communicate with the user device and with a second wireless transceiver associated with a second vehicle; and ii) a master controller module configured in a blind rebroadcast mode: a) to receive via the first wireless transceiver a control message sent from a transmitting source and to transmit the control message via the first wireless transceiver to the second wireless transceiver associated with the second vehicle; and b) to receive via the first wireless transceiver a response message originated by the PEPS system of the target vehicle and to transmit the response message via the first wireless transceiver to the transmitting source. The master controller module is configure in a community broadcast mode: c) to receive via the first wireless transceiver the control message sent from the transmitting source and to determine from the control message the target vehicle to which the control message is to be sent; and d) to determine from a community broadcast table in a memory associated with the master controller module a relay path from the first vehicle to the target vehicle, the relay path comprising at least one intermediate vehicle between the first vehicle and the target vehicle.

There is provided a method of providing a communication link between a passive entry and passive (PEPS) start system of a target vehicle and a user device operable to control the PEPS system. The method comprises: i) in a first wireless transceiver associated with a first vehicle and configured to communicate with the user device, establishing a wireless connection to a second wireless transceiver associated with a second vehicle; and ii) in a blind rebroadcast mode: a) receiving via the first wireless transceiver a control message sent from a transmitting source; b) transmitting the control message via the first wireless transceiver to the second wireless transceiver associated with the second vehicle; c) receiving via the first wireless transceiver a response message originated by the PEPS system of the target vehicle; and d) transmitting the response message via the first wireless transceiver to the transmitting source.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is an exemplary community broadcast table in the BLE module in FIG. 2.

In the drawings, reference numbers may be reused to identify similar and/or identical elements.

DETAILED DESCRIPTION

A passive entry and passive start (PEPS) system in a vehicle may include a Bluetooth low energy (BLE) module configured to advertise and pair with a user device, such as a key fob, a smartphone, or another type of mobile device. The BLE module transmits data to, and receives data from, the user device via at least one antenna.

When the mobile device is near the vehicle, a user may press an exterior button on the vehicle or on the user device in order to lock or unlock the vehicle doors. When the user device is within the vehicle, the user may start the vehicle by pressing an interior button or other actuator. In this way, the user device acts as a traditional mechanical key.

In certain environments, the effective ranges of the BLE modules in the user device and the target vehicle may be greatly extended by relaying signals between the vehicle BLE module and the user device BLE module via a wireless network comprised of one or more intermediate vehicles that are equipped with compatible, authorized BLE modules. For example, in the sales lot of a car dealership with multiple vehicles assigned to the wireless network, the BLE PEPS system may extend its range by relaying signals through multiple participating vehicles.

One well-known type of wireless network technology that may be used for this purpose is a wireless ad hoc network (WANET) or mobile ad-hoc network (MANET). An ad hoc network is a decentralized network comprised of a plurality of peer nodes. The ad hoc network does not use a pre-existing infrastructure, such as the routers and access points of a managed network. Each ad hoc node routes or forwards data for other nodes. The determination of which nodes forward data is made dynamically on the basis of network connectivity and the routing algorithm in use. Wireless mobile ad hoc networks are self-configuring, dynamic networks in which nodes are free to move. Wireless ad hoc networks lack the complexities of infrastructure setup and administration. Thus, user devices and nodes are able create and join networks "on the fly".

Figure 1:
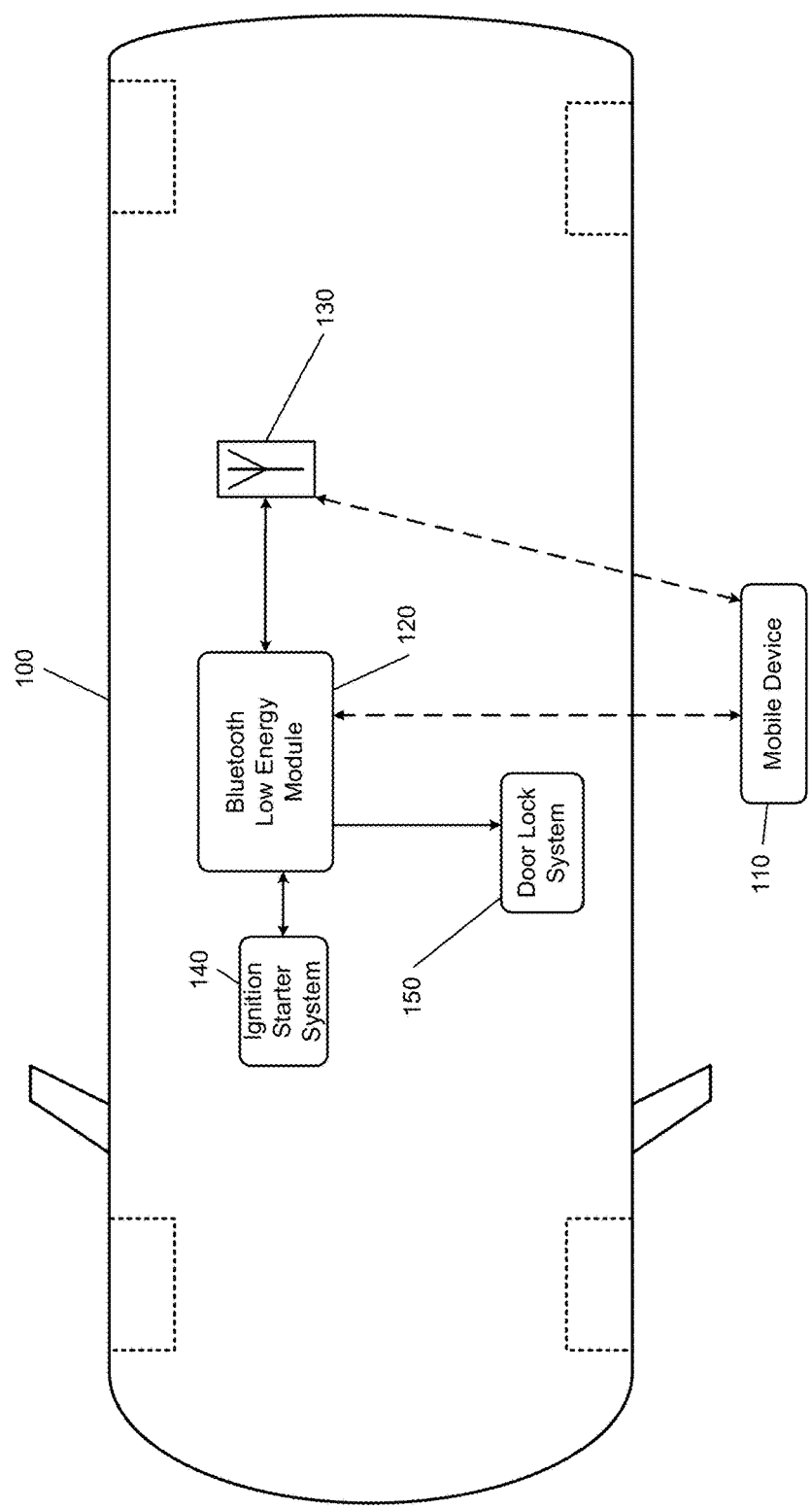
FIG. 1 is a functional block diagram of a passive entry and passive start system (PEPS) in a vehicle.

FIG. 1 is a functional block diagram of a passive entry and passive start (PEPS) system in a vehicle 100. The PEPS system comprises Bluetooth low energy (BLE) module 120, antenna 130, ignition starter system 140, and door lock system 150. A transceiver (not shown) in BLE module 120 is configured to communicate bi-directionally with a user device, namely mobile device 110, via antenna 130. Additionally, BLE module 120 may comprise an internal antenna (not shown) for communicating with mobile device 110. According to the principles of the present disclosure, BLE module 120 is configured to receive commands from mobile device 110 that cause BLE module 120 to activate ignition switch 140 to start the engine of vehicle 100. BLE module 120 is further configured to receive commands from mobile device 110 that cause BLE module 120 to activate door lock system 150 to unlock the doors of vehicle 100.

In the exemplary embodiment, signals according to the Bluetooth Low Energy (BLE) protocol are generated at a predetermined radio frequency, such as 2.4 gigahertz (GHz) radio frequency or another frequency specified by the BLE protocol. In this manner, the vehicle 100 connects with the mobile device 110 to allow passive locking and unlocking of door locks of the vehicle 100 and passive starting of the engine of the vehicle 100. The mobile device 110 may be a mobile phone, a tablet, a key fob, or another type of wireless mobile electronic device.

The mobile device 110 is paired with the vehicle 100 by a user using a traditional pairing process or an application on the mobile device 110. The pairing can be manual or automatic (when the mobile device 110 includes an application that performs automatic pairing). Typically the manual pairing process includes triggering a pairing mode using vehicle and/or smartphone interfaces and selecting the vehicle 100 on the mobile device 110 interface (or vice versa). Some pairing processes may further require the use of a password or key to be entered into the vehicle 100 or mobile device 110 or retrieved from an online server.

Once paired, the BLE module 120 is configured to selectively wirelessly transmit data to the mobile device 110 and receive data from the mobile device 110. During use, the BLE module 120 periodically advertises a connection. When the mobile device 110 is within a predetermined distance from the vehicle 100, the mobile device 110 pairs with the BLE module 120 and a connection is established. To identify a zone (or location and proximity) of the mobile device 110 relative to the vehicle 100, the BLE module 120 transmits a predetermined signal to the mobile device 110. The BLE module 120 receives a response from the mobile device 110 including an RSSI and an identifier for mobile device 110.

According to the principles of the present disclosure, the BLE module 120 is configured to pair with and communicate with the BLE modules 120 of neighboring vehicles 110 that are within the range of the Bluetooth transceiver in the BLE module 120. This enables the BLE module 120 to transmit and receive information about neighboring vehicles that can communicate with vehicle 100. In this way, each vehicle can build and share a community broadcast table that can be used to identify communication paths from a mobile device 110 and a target vehicle using one or more RF relay hops through neighboring vehicles.

Figure 2:
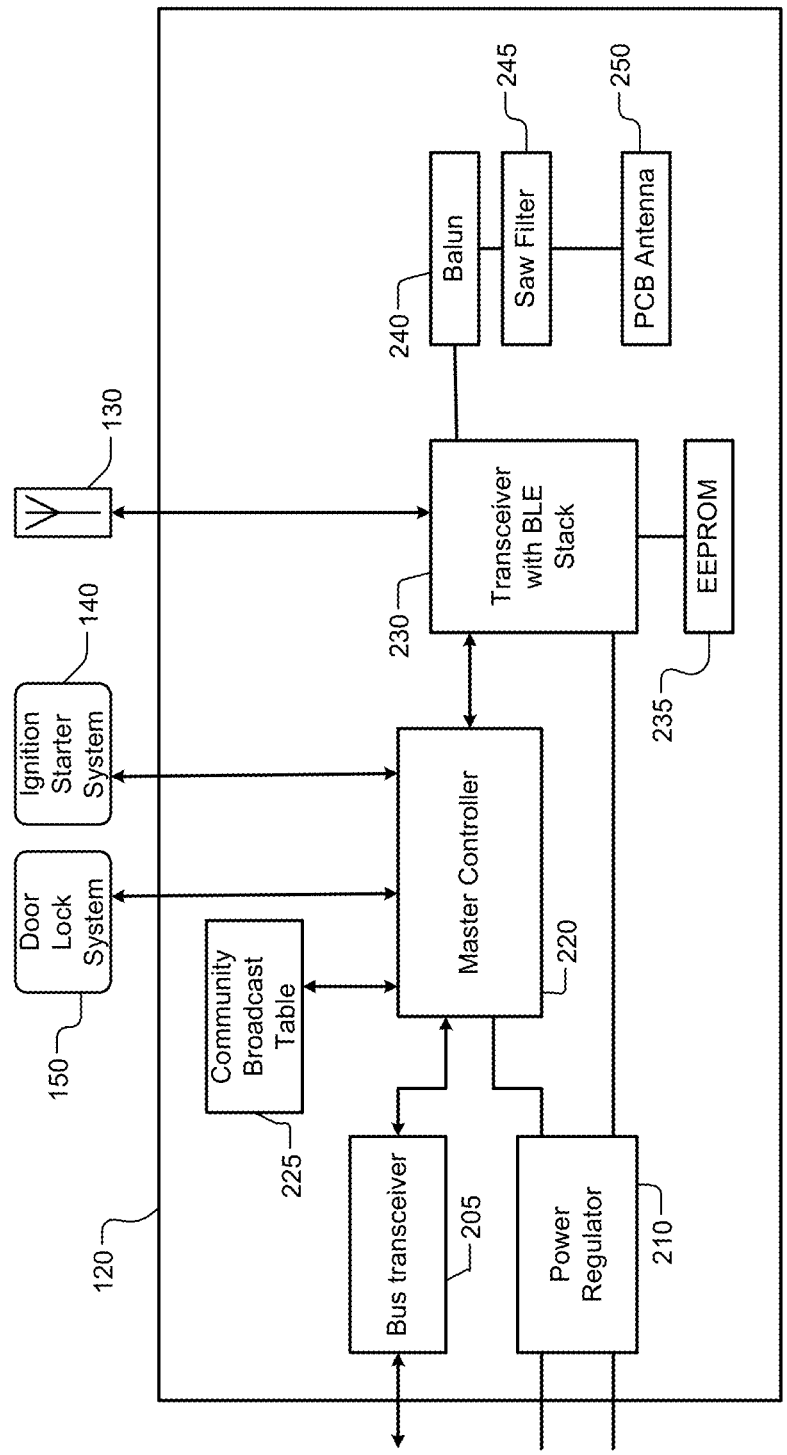
FIG. 2 is a functional block diagram of the Bluetooth Low Energy (BLE) module in FIG. 1 in greater detail.

FIG. 2 is a functional block diagram of the Bluetooth Low Energy (BLE) module 120 in FIG. 1 in greater detail. BLE module 120 comprises a bus transceiver 205 which is a wired transceiver that communicates with a network bus (not shown) in vehicle 100. The vehicle network bus may include a local interconnect network (LIN) bus, a controller area network (CAN) bus or other type of bus. The BLE module 120 further includes a power regulator 210 that regulates power from a vehicle power bus and provides a predetermined voltage and/or current signal to the other devices.

The bus transceiver 205 provides an interface between devices in the BLE module 120 and the vehicle network bus. An output of the bus transceiver 205 is input to a master controller module 220. The master controller module 220 is configured to generate and transmit messages to mobile device 110 and to receive the messages including RSSI values from mobile device 110 and from BLE modules 120 in other vehicles. The master controller module 220 communicates with a wireless transceiver 230 having a BLE stack that provides a wireless interface to mobile device 110 and other BLE modules 120. The wireless transceiver 230 transmits data to mobile device 110 and to other BLE modules 120 and receives data from mobile device 110 and from other BLE modules 120 via a transceiver output circuit including a balun 240, a saw filter 245, and an antenna 250.

Components of the BLE module 120 may be mounted on a printed circuit board (PCB). Memory 235 such as random access memory (RAM), read-only memory (ROM), electronically erasable and programmable ROM (EEPROM), and the like may be provided to store data for the master controller module 220 and/or wireless transceiver 230. In an advantageous embodiment, a specific memory (or portion of memory 235) may be used to store community broadcast table 225. BLE module 120 builds community broadcast table 225 by determining a list of vehicles with which BLE module 120 can establish communication links. BLE module 120 then stores its own vehicle identification (VID) list in community broadcast table 225. BLE module 120 also receives VID lists from other neighboring vehicles, either by direct communication link or by a relay link through another neighboring vehicle. BLE module 120 also stores the VID lists of all other vehicles in community broadcast table 225. In this manner, BLE module 120 possesses a complete network topology of all nodes in the ad hoc network (or similar peer-to-peer network).

Under the control of the master controller module 220, BLE module may communicate in two modes: 1) blind rebroadcast mode; and 2) community broadcast mode. In blind rebroadcast mode, as the mobile device 110 approaches a group of vehicles, the mobile device 110 may recognize one of more vehicles that provide rebroadcasting service that extends the range of mobile device 110. Mobile device 110 then sends a request message to the vehicle(s) to rebroadcast messages to a target vehicle from the mobile device 110. Every vehicle in the vicinity will rebroadcast the message until the target vehicle acknowledges receipt of the message(s) or until a timeout event occurs. Once the target vehicle acknowledges the rebroadcast message, the mobile device 110 transmits data out to be rebroadcast to the target vehicle in the network.

In community broadcast mode, each vehicle that supports the rebroadcast service and that is part of the peer-to-peer network will actively scan for nearby vehicles in its community and thereby develops community broadcast table 225. The community broadcast table 225 is shared among the community, so that each vehicle knows its immediate neighbor(s) and also the neighboring vehicle(s) of its immediate neighbor(s). This can be done either proactively (all the time in off mode) or when a vehicle initiates a community to be set up.

Figure 3:
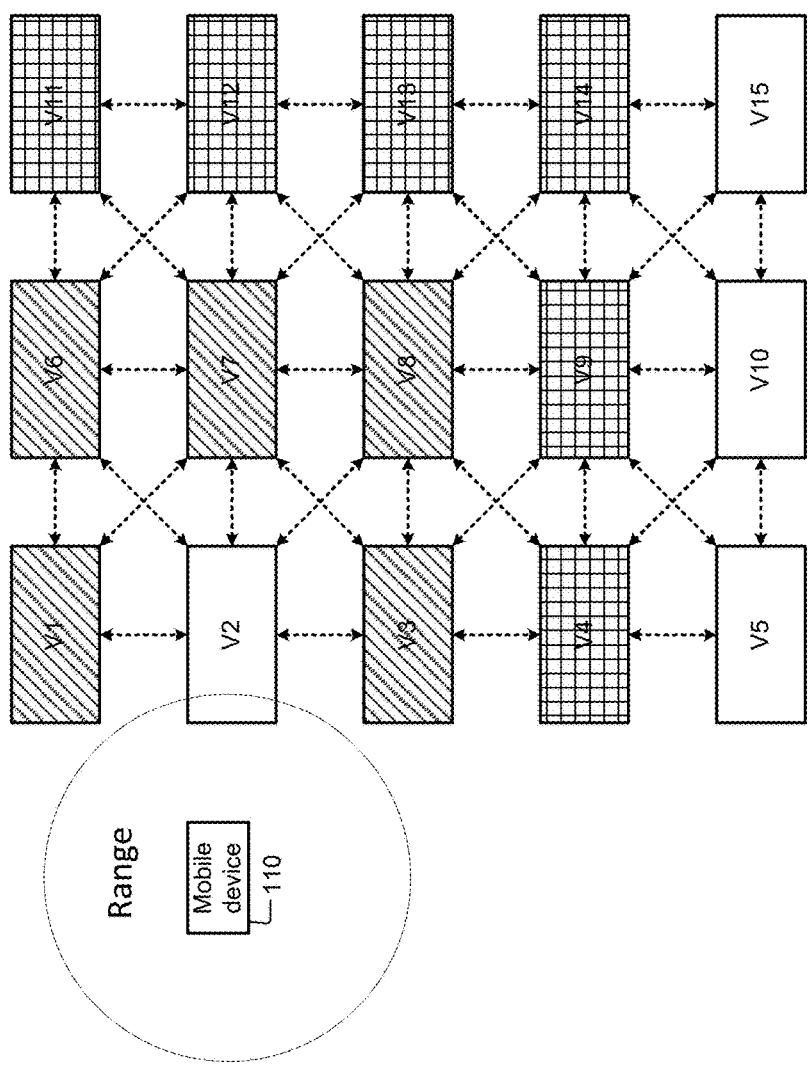
FIG. 3 is a diagram of a network topology for a BLE PEPS vehicle relay system that extends the range of a BLE module in a vehicle.

FIG. 3 is a diagram of a network topology for a BLE PEPS vehicle relay system that extends the range of a BLE module 120 in a vehicle. In FIG. 3, mobile device 110 approaches a parking lot of vehicles that form nodes in the peer-to-peer network. In the exemplary embodiment, there are fifteen (15) vehicles, labeled V1 through V15, in the parking lot. Mobile device 110 initially establishes an RF connection to vehicle 2 (V2).

In blind rebroadcast mode, the mobile device 110 first transmits a PEPS system control message to vehicle V2. Vehicle V2 then re-broadcasts (dotted lines) the PEPS control message to a first tier of vehicles (V1, V3, V6, V7, V8) that are in communication range of V2. The first tier vehicles are shaded by diagonal lines. The first tier vehicles then rebroadcast to a second tier of vehicles (V4, V9, V11, V12, V13, V14) that are in communication range of the first tier vehicles. The second tier vehicles are shaded by vertical and horizontal lines. Finally, the second tier vehicles rebroadcast to a third tier of vehicles (V5, V10, V15) that are in communication range of the second tier vehicles. In this way, the target vehicle (V15) is finally reached. Each node remembers the node(s) from which it received the PEPS control message and the node(s) to which it forwarded the PEP control message. In this way, the target vehicle can then transmit a response message back along the same path to the mobile device 110.

FIG. 4 is an exemplary community broadcast table 225 in the BLE module 120 in FIG. 2. Each column in community broadcast table 225 is the vehicle identification (VID) list for each vehicle in the peer-to-peer network. For example, vehicle V1 is able to communicate with vehicles V2, V6, and V7. Also, vehicle V2 is able to communicate with the first tier vehicles V1, V3, V6, V7, and V8. Vehicle V3 is able to communicate with vehicles V2, V4, V7, V8, and V9. Similarly, vehicle V9 is able to communicate with vehicles V3, V4, V5, V8, V10, V13, V14, and V15.

Figure 5:
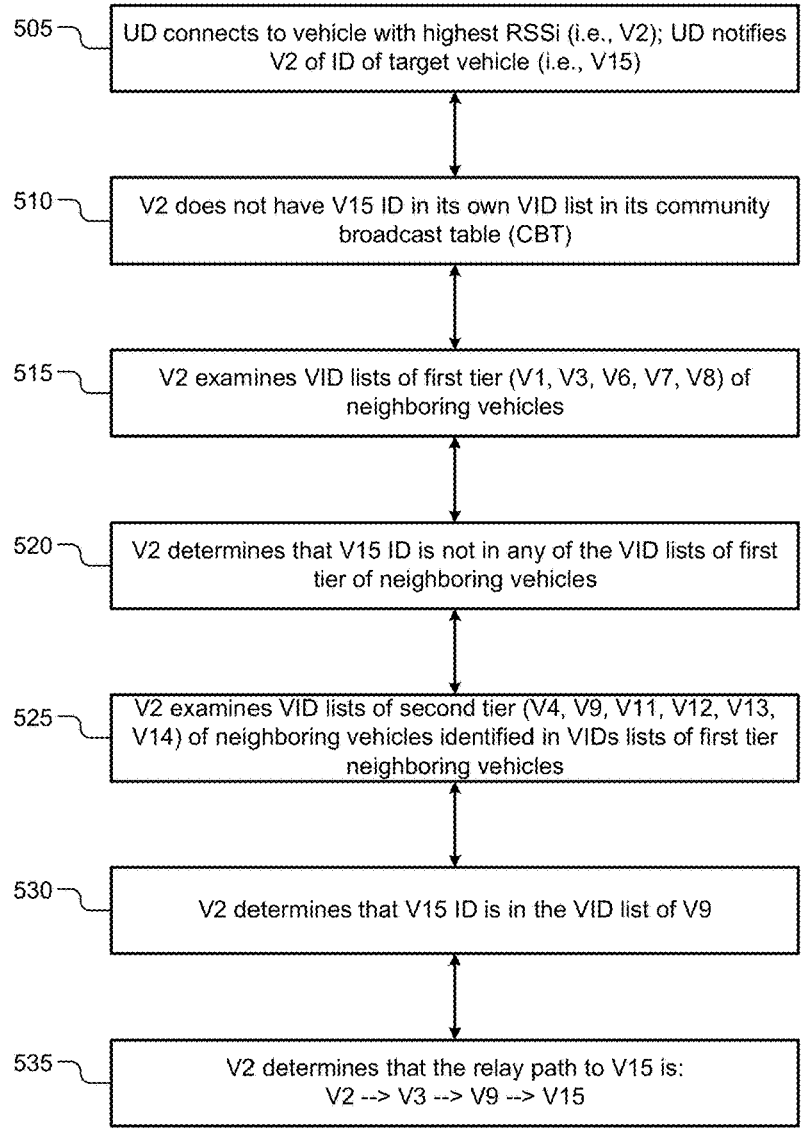
FIG. 5 is a flow diagram of a method of relaying a message from a user device to a target vehicle.

FIG. 5 is a flow diagram of a method of relaying a message from a user device to a target vehicle using community broadcast table 225. In the method below, it is assumed that all steps in vehicle V2 are performed by master controller module 220 in BLE module 120. In 505, the user device (UD), which may be a key fob, a smartphone, or other mobile device 110, connects to the vehicle with the highest RSSi (i.e., V2). The user device then notifies V2 of the VID of the target vehicle (i.e., V15). In 510, V2 determines that does not have V15 in its own VID list in community broadcast table (CBT) 225.

In 515, V2 examines the VID lists in CBT 225 of the first tier (V1, V3, V6, V7, V8) of neighboring vehicles to see if V15 is in one of the VID lists of the first tier vehicles. In 520, V2 determines that V15 is not in any of the VID lists in CBT 225 of the first tier of neighboring vehicles.

In 525, V2 examines the VID lists in CBT 225 of the second tier (V4, V9, V11, V12, V13, V14) of neighboring vehicles identified in the VID lists of the first tier of neighboring vehicles. In 530, V2 determines that target vehicle V15 is in the VID list of vehicle V9. In 535, V2 thereby determines that the relay path to target vehicle V15 is: (V2→V3→V9→V15).

At this point, vehicle V2 can transmit the relay path information (V2→V3→V9→V15) to each of the other vehicles (V3, V9, V15) in the relay path to alert them to the transmissions between the user device and target vehicle V15. Thereafter, message from the user device are relayed to target vehicle V15 using just vehicles V2, V3, V9, and V15.

The BLE module 120 in each of the 15 vehicles in the peer-to-peer network is capable of performing both in the blind rebroadcast mode and in the community broadcast mode as described above. Thus, each BLE module 120 is configured to perform bidirectional communications with the user device and is also configured to act as a relay point between the BLE modules 120 of other vehicles in the peer-to-peer network. As a result, the user device (key fob, smartphone, or other mobile device) is configured to use the BLE modules 120 in one or more intermediate vehicles to transmit commands/messages to, and receive responses from, the BLE modules 120 associated with the PEPS system of a remote target vehicle, even though the remote vehicle is out of range of the BLE transceiver of the user device.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the implementations is described above as having certain features, any one or more of those features described with respect to any implementation of the disclosure can be implemented in and/or combined with features of any of the other implementations, even if that combination is not explicitly described. In other words, the described implementations are not mutually exclusive, and permutations of one or more implementations with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An apparatus operable to provide a communication link between a passive entry and passive start (PEPS) system of a target vehicle and a user device operable to control the PEPS system, the apparatus comprising:
   a first wireless transceiver adapted to be installed in a first vehicle and configured to communicate with the user device and with a second wireless transceiver associated with a second vehicle; and
   a master controller module configured:
      in a blind rebroadcast mode:
         to receive via the first wireless transceiver a control message sent from a transmitting source and to transmit the control message via the first wireless transceiver to the second wireless transceiver associated with the second vehicle; and
         to receive via the first wireless transceiver a response message originated by the PEPS system of the target vehicle and to transmit the response message via the first wireless transceiver to the transmitting source; and
      in a community broadcast mode:
         to receive via the first wireless transceiver the control message sent from the transmitting source and to determine from the control message the target vehicle to which the control message is to be sent; and
         to determine from a community broadcast table in a memory associated with the master controller module a relay path from the first vehicle to the target vehicle, the relay path comprising at least a first intermediate vehicle between the first vehicle and the target vehicle,
      wherein the community broadcast table comprises i) a first vehicle identification list of all vehicles with which the first vehicle can communicate, and ii) at least a second vehicle identification list of all vehicles with which the first intermediate vehicle can communicate, wherein the second vehicle identification list is transmitted from the first intermediate vehicle to the first vehicle in response to a request from the first vehicle.

2. The apparatus of claim 1 wherein the master control module transmits to the first intermediate vehicle the control message and information associated with the relay path to the first intermediate vehicle.

3. The apparatus of claim 1 wherein the community broadcast table further comprises a first vehicle identification list of all vehicles with which the first vehicle can communicate.

4. The apparatus of claim 3 wherein the community broadcast table comprises at least a third vehicle identification list of all vehicles with which at least a second intermediate vehicle can communicate.

5. The apparatus of claim 1 wherein the transmitting source is the user device.

6. The apparatus of claim 1 wherein the second vehicle is the target vehicle.

7. The apparatus of claim 1 wherein the second vehicle identification list is transmitted from the first intermediate vehicle to the first vehicle when the first vehicle initially communicates with the first intermediate vehicle.

* * * * *